(12) United States Patent
Zheng et al.

(10) Patent No.: US 7,927,445 B2
(45) Date of Patent: Apr. 19, 2011

(54) VERTICAL MANUFACTURING OF COMPOSITE WIND TURBINE TOWER

(75) Inventors: Danian Zheng, Simpsonville, SC (US); Lawrence D. Willey, Simpsonville, SC (US); Wendy W. Lin, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 125 days.

(21) Appl. No.: 12/425,649

(22) Filed: Apr. 17, 2009

(65) Prior Publication Data

US 2010/0132877 A1    Jun. 3, 2010

(51) Int. Cl.
*B29C 53/62*    (2006.01)

(52) U.S. Cl. .......... 156/187; 156/172; 156/185; 264/33; 264/214; 264/294; 264/308

(58) Field of Classification Search ........................ None
See application file for complete search history.

(56) References Cited

U.S. PATENT DOCUMENTS

| | | | | | |
|---|---|---|---|---|---|
| 4,403,460 | A | * | 9/1983 | Hills | 52/745.01 |
| 6,108,998 | A | * | 8/2000 | Dumlao | 52/783.17 |
| 6,343,440 | B1 | * | 2/2002 | Ayers | 52/40 |
| 2003/0034576 | A1 | * | 2/2003 | Russell | 264/33 |
| 2008/0184654 | A1 | * | 8/2008 | Polyzois et al. | 52/651.01 |
| 2009/0313913 | A1 | * | 12/2009 | Malheiro De Aragao et al. | 52/40 |

FOREIGN PATENT DOCUMENTS

JP    8134848 A    5/1996

OTHER PUBLICATIONS

Vionis, et al., "Development of a MW Scale Wind Turbine for High Wind Complex Terrain Sites; The MEGAWIND Project," (EWWC, Mar. 1, 2006).
Vionis, et al., Power Point Slides on "Development of a MW Scale Wind Turbine for High Wind Complex Terrain Sites; The MEGAWIND Project," (EWWC, Mar. 1, 2006).
Final Technical Report, European Community Project No. ENK5-2000-00328 for "Megawind," (Nov. 2005).
"Gleitschalung Fuer Engen, Konischen Turm" Beton Und Stahlbetonbau, Ernst Und Sohn Verlag, vol. 93, No. 10, Oct. 1, 1998, pp. A13/A14, Berlin, Germany, XP 000786698, ISSN: 0005-9900.
V.M. Karbhari, "Civil Infrastructure Application" In: D.B. Miracle & S.L. Donaldson: "Composites", vol. 21, pp. 1091-1100, Dec. 2001, ASM International, USA, XP 002593670, ISBN: 087170739.
European Search Report and Written Opinion issued in connection with EP Patent Application No. 10159639.3, Sep. 16, 2010.

* cited by examiner

*Primary Examiner* — Sam C Yao
(74) *Attorney, Agent, or Firm* — William F. Heinze; Ernest G. Cusick; Frank A. Landgraff

(57) ABSTRACT

A method of manufacturing a composite tower, includes at least partially filling a form with a curable resin; at least partially curing the resin in the form; raising the form partly over the at least partially cured resin; and at least partially filling the raised form with more curable resin applied against the cured resin.

10 Claims, 3 Drawing Sheets

US 7,927,445 B2

VERTICAL MANUFACTURING OF COMPOSITE WIND TURBINE TOWER

CROSS REFERENCE TO RELATED APPLICATIONS

The subject matter disclosed here is generally related to commonly-owned, copending U.S. patent application Ser. No. 12/109,463 for "A Composite Wind Turbine Tower and a Method for Fabricating Same" filed on Apr. 25, 2008 and U.S. patent application Ser. No. 12/038,471 for "Composite Wind Turbine Tower" filed on Feb. 27, 2008, each of which is incorporated by reference here.

BACKGROUND OF THE INVENTION

1. Technical Field

The subject matter described here generally relates to wind turbine tower structures and methods of forming composite wind turbine tower structures.

2. Related Art

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator or wind power plant.

Wind turbines are typically categorized according to the vertical or horizontal axis about which the blades rotate. One so-called horizontal-axis wind generator is schematically illustrated in FIG. 1 and available from General Electric Company. This particular configuration for a wind turbine 2 includes a tower 4 supporting a nacelle 6 enclosing a drive train 8. The blades 10 are arranged on a hub 9 to form a "rotor" at one end of the drive train 8 outside of the nacelle 6. The rotating blades 10 drive a gearbox 12 connected to an electrical generator 14 at the other end of the drive train 8 arranged inside the nacelle 6 along with a control system 16 that receives input from an anemometer 18.

As the size of blades 10 has increased, so has size of the towers 4. Current wind turbine towers 4 are typically fabricated from steel sheets that are manufactured at a remote location and then assembled at the site of the turbine 2. However, these materials are often difficult and expensive to manufacture, transport, and assemble. While using composite material can reduce the weight and transportation costs for the components of the tower 4, conventional techniques often still require transportation of multiple pieces that must then be joined together at an outdoor construction site.

BRIEF DESCRIPTION OF THE INVENTION

These and other drawbacks associated with such conventional approaches are addressed here in by providing, in various embodiments, a method of manufacturing a composite tower including at least partially filling a form with a curable resin; at least partially curing the resin in the form; raising the form partly over the at least partially cured resin; and at least partially filling the raised form with more curable resin applied against the cured resin.

BRIEF DESCRIPTION OF THE DRAWINGS

Various aspects of this technology will now be described with reference to the following figures ("FIGS.") which are not necessarily drawn to scale, but use the same reference numerals to designate corresponding parts throughout each of the several views.

DETAILED DESCRIPTION OF THE INVENTION

Figure 1:
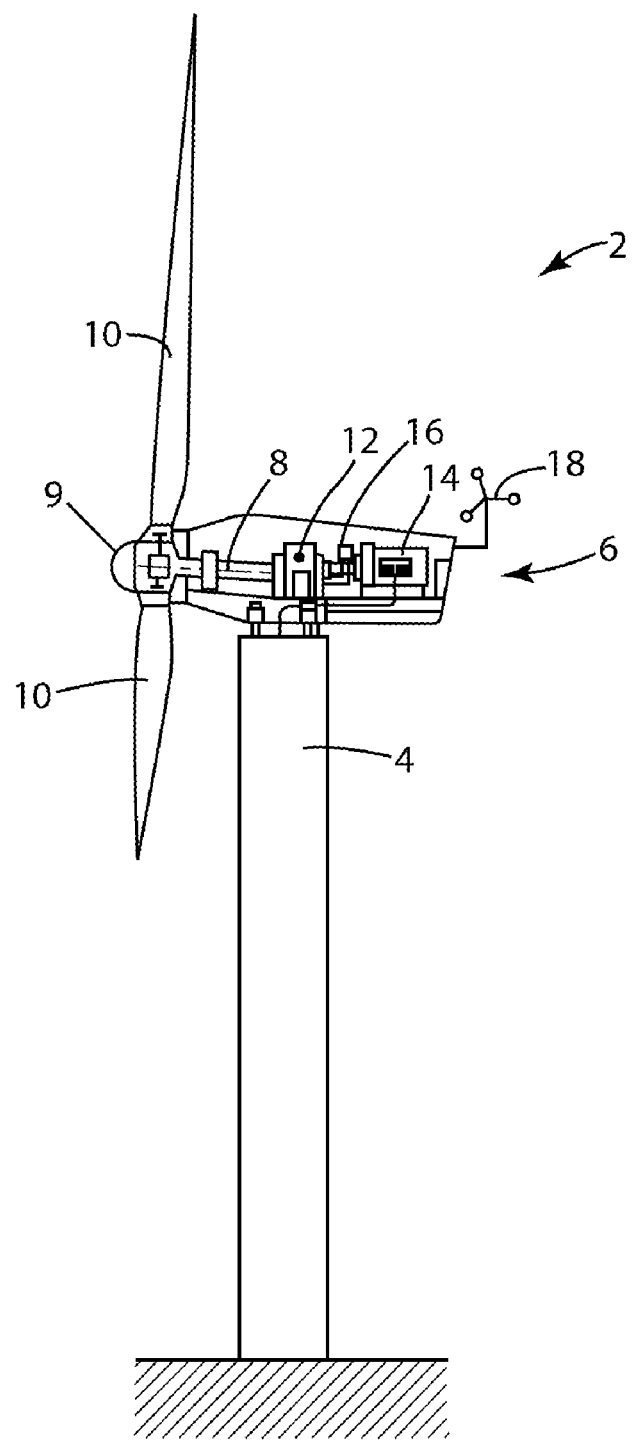
FIG. 1 is a schematic side view of a conventional wind generator.
Figure 2:
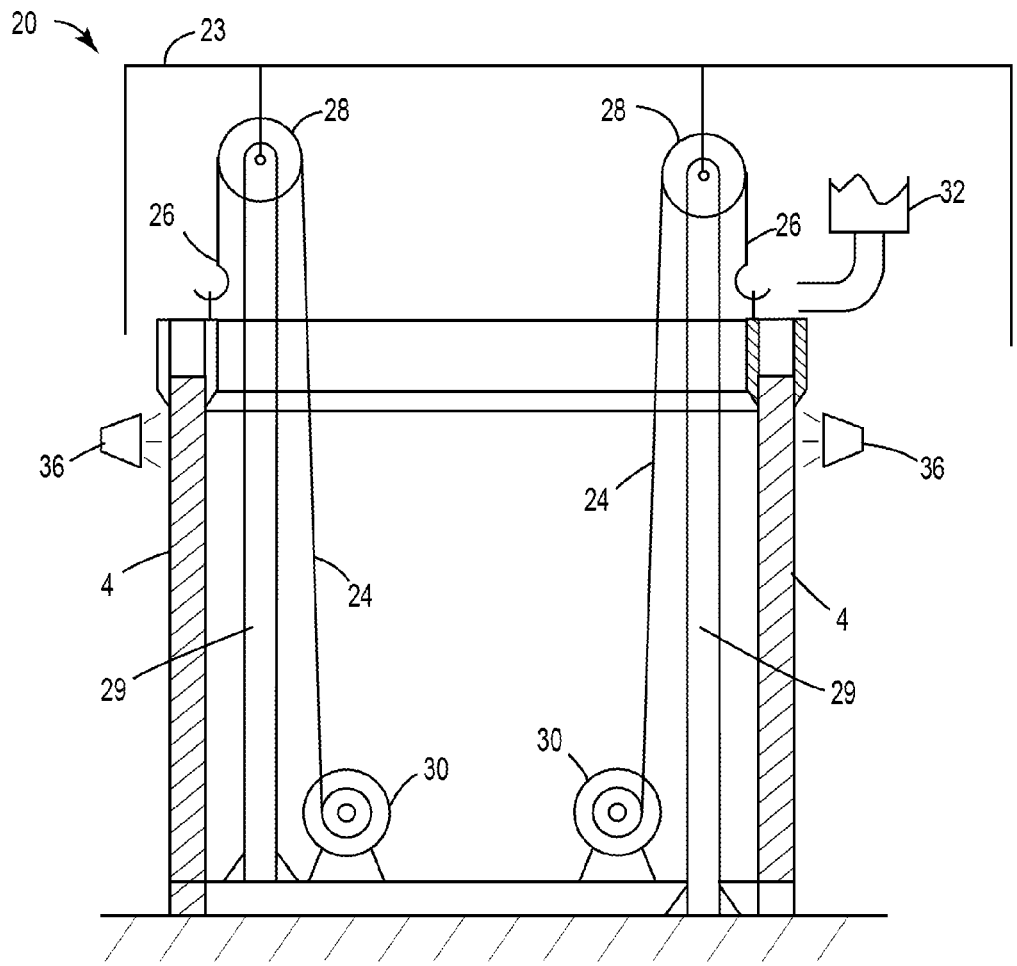
FIG. 2 is a schematic cross-sectional view of a system for vertical manufacturing of the wind turbine tower shown in FIG. 1.

FIG. 2 is a schematic cross-sectional view of one embodiment of a system 20 for vertical manufacturing of the wind turbine tower 4 shown in FIG. 1, or any other tower. Although the illustrated tower 4 has a substantial circular cross-section with decreasing diameter in the vertical direction, other tow cross-sections may also be used including elliptical and/or polygonal.

The vertical manufacturing system 20 includes a form or collar 22 that is raised as lower portions of the tower 4 are formed. The form 22 may be annular extending fully or partially around the tower 4. In the example shown here, the form 22 is connected to a chain or cable 24 by a releasable fastener 26 such as a hook or clasp. The cable 24 extends over one or more pulleys 28 and/or other tackle on support structures 29 to a winch 30 where the cable is wound in order to raise the form 22. The system 20 may therefore be referred to as "self-jack-up collar." However, various other techniques may also be used to raise and/or lower the form 22. Each new layer of resin may be about one-half to one foot tall. An optional cover 23 may be provided to protect the interior of the tower 4 from the environment during fabrication, and allow interior placement of production materials.

A resin supply 22 provides resin and any optional reinforcing material to the trough 34 formed between the inner and out walls of the form 22. For example, the resin may be pumped through a hose from the ground. Suitable resin matrix materials may include, but are not limited to, polyester, polyvinyl, epoxy or any other matrix suitable for formation of composite material.

In an initial position, the bottom of the form 22 will be resting on a foundation as it is filled with resin. Various sealing techniques may be used to prevent the resin from leaking from the form 22 if necessary. For example, the bottom of the form 22 may be provided with a permanent or disposable rubber skirt that secures tightly against lower portions of the tower 4. Alternatively, or in addition, the walls of the form 22 may provide a surface against which a wet or dray lay-up process is used to form the tower 4.

The resin is allowed to cure, or partially cure before the form 22 is raised to a new position. For example, an energy source 36 such as an infrared red or ultra violet radiation may be provided to promote the curing process. Once the resin is cured, or partially cured, and the formed 22 is raised to a new position, then the process is repeated. In this way, the tower 4 is gradually built up in a series of relatively thin layers resting upon previous layers.

Figure 3:
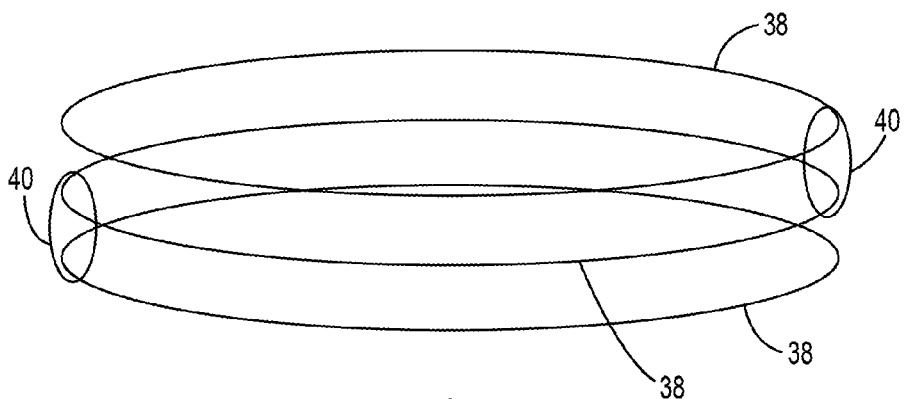
FIG. 3 is a schematic diagram of a reinforcing system for the system shown in FIG. 2.

Various techniques may be used to provide reinforcement to the tower 4 in order to enhance bending strength and/or stiffness of the resin matrix. As illustrated in FIG. 3, one or more rib rings 38 may be arranged in the trough 34. For example, a ring 38 may be secured to the form 22 while the resin cures or partially cures. Two or more of the rings 38 may also be connected or otherwise joined with axial supports, such as axial windings 40. Although only two axial windings 40 are shown in FIG. 3, any number of windings may also be provided and they may extend around the rings 38. One of the joined rings 38 may be submerged into the resin-filled trough 34 with the other ring arranged above the trough 34 for receiving axial windings 40 for the next ring when the form 22 is moved upward.

Figure 4:
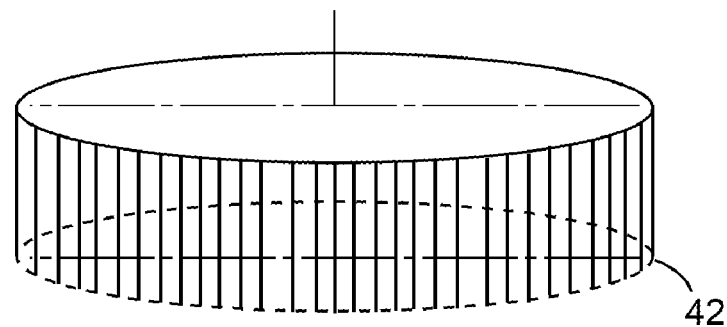
FIG. 4 is a schematic view of a reinforcing arrangement for the system shown in FIG. 2.
Figure 5:
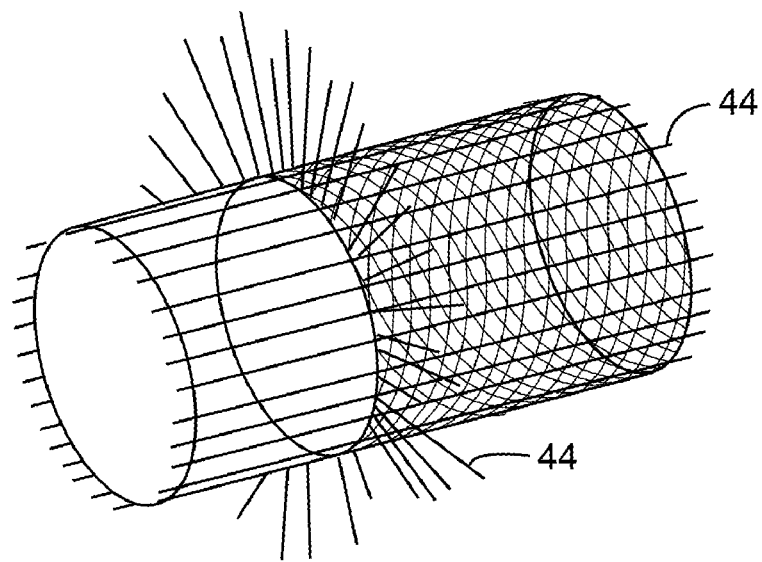
FIG. 5 is a schematic view of another reinforcing arrangement for the system shown in FIG. 2.

As illustrated in FIG. 4, vertical protrusions 42 may extend from the wall of the tower 4 into the trough 34 to provide axial reinforcement. As illustrated in FIG. 5, the protrusions 42 may act as a mandrel 44 around which reinforcing fibers 44 may be wound. Alternatively, or in addition, the inner wall of the trough 34 may provide a suitable mandrel for winding the fibers 44. In this regard, the form 22 may also be provided with various rotational capabilities in order to facilitate winding of the fibers 44. Alternatively, or in addition, a short mandrel (not shown) may be provided in the trough 34 in against which the fibers 44 may be wound. The form 22 may be also provided with multiple walls that act as both the mandrel for the fiber winding process and resin solidification mold. A fiber pre-form may also be used in the trough 44.

Figure 6:
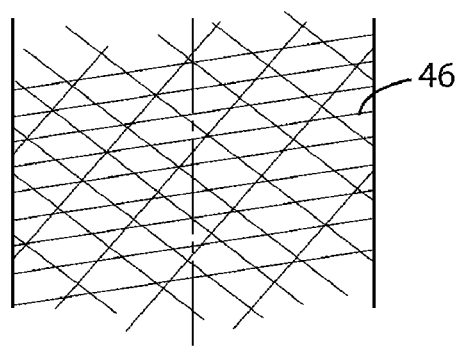
FIG. 6 is a schematic view of yet another reinforcing arrangement for the system shown in FIG. 2.

As discussed in commonly-owned, copending U.S. patent application Ser. No. 12/038,471 for "Composite Wind Turbine Tower" filed on Feb. 27, 2008, the fibers 44 may include longitudinal fibers and hoop-wise fibers. Alternatively, or in addition, a tape 46 may be wound around the tower 4 as illustrated in FIG. 6. The axial windings 40, vertical protrusions 42, fibers 44, and/or tape 46 may be natural or man-made fibers, such as glass fibers, carbon fibers, metal fibers or any other fibers suitable for forming a composite material. The tape 46 may be fabric tape with a high axial orientation. The number of windings 40, protrusions 42, and fibers 44 is not limited and may include any number and any density suitable for providing a suitable strong composite material.

The technology describe above offers a various advantages over conventional approaches. For example, the vertical manufacturing system 20 allows the tower 4 to be formed as a contiguous body, rather than in multiple sections. One-piece construction substantially reduces the cost of the tower by eliminating the need for intra-section flanges and the attended bolt torque maintenance. The system 20 provides for the use of composite materials while avoiding the costly logistics associated with transporting tower sections from factory locations and providing significant on-site manufacturing facilities It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

What is claimed is:

1. A method of manufacturing a composite tower, comprising:
    at least partially filling a form with a curable resin;
    at least partially curing the resin in the form;
    raising the form partly over the at least partially cured resin; and
    at least partially filling the raised form with more curable resin applied against the cured resin adding a reinforcing material to the curable resin;
    adding a reinforcing material to the curable resin;
    wherein the step of adding a reinforcing material to the curable resin comprises winding fibers around a mandrel; and
    wherein the mandrel comprises a wall of the form.

2. The method recited in claim 1, wherein the reinforcing material further comprises at least one ring.

3. The method recited in claim 2, wherein the at least one ring comprises a plurality of rings that are joined together.

4. The method recited in claim 1, wherein the reinforcing material further comprises a plurality of vertical protrusions extending into the curable resin.

5. The method recited in claim 1, wherein the reinforcing material further comprises a spiral tape.

6. The method recited in claim 1, wherein the form comprises an annular form.

7. A method of manufacturing a composite tower for a wind turbine, comprising:
    at least partially filling an annular form with a curable resin;
    adding a reinforcing material to the curable resin;
    at least partially curing the resin in the form;
    raising the form partly over the at least partially cured resin; and
    at least partially filling the raised form with more curable resin against the cured resin;
    wherein the reinforcing material comprises a plurality of vertical protrusions extending into the more curable resin;
    wherein the step of adding a reinforcing material to the curable resin comprises winding fibers around a mandrel; and
    wherein the mandrel comprises a wall of the annular form.

8. The method recited in claim 7, wherein the reinforcing material further comprises at least one ring.

9. The method recited in claim 8, wherein the at least one ring comprises a plurality of rings that are joined together.

10. The method recited in claim 7, wherein the reinforcing material further comprises a spiral tape.

* * * * *